(12) United States Patent
Storm et al.

(10) Patent No.: US 12,399,819 B2
(45) Date of Patent: Aug. 26, 2025

(54) MEMORY SYSTEM CHARACTERISTIC CONTROL

(71) Applicant: Micron Technology, Inc., Boise, ID (US)

(72) Inventors: Shawn Storm, Boise, ID (US); Joseph A. Oberle, Sunnyvale, CA (US); Ji-Hye Gale Shin, Palo Alto, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/608,251

(22) Filed: Mar. 18, 2024

(65) Prior Publication Data

US 2024/0330174 A1 Oct. 3, 2024

Related U.S. Application Data

(60) Provisional application No. 63/455,120, filed on Mar. 28, 2023.

(51) Int. Cl.
*G06F 12/00* (2006.01)
*G06F 12/02* (2006.01)

(52) U.S. Cl.
CPC ............... *G06F 12/0246* (2013.01)

(58) Field of Classification Search
CPC ..... G06F 12/0246; G11C 16/12; G11C 16/14; G11C 16/34
USPC ........................................ 711/103
See application file for complete search history.

(56) References Cited

U.S. PATENT DOCUMENTS

| | | | |
|---|---|---|---|
| 9,323,304 B2 | 4/2016 | Salessi et al. | |
| 10,379,739 B1 | 8/2019 | Bazarsky et al. | |
| 10,891,052 B2 | 1/2021 | Navon et al. | |
| 2016/0170871 A1* | 6/2016 | Hyun | G06F 3/0653 |
| | | | 711/103 |
| 2021/0373642 A1* | 12/2021 | Wang | G06F 9/4411 |
| 2022/0165337 A1* | 5/2022 | Bhatia | H03M 13/611 |
| 2022/0180932 A1* | 6/2022 | Secatch | G11C 16/102 |
| 2022/0326884 A1* | 10/2022 | Kang | G06F 13/28 |

* cited by examiner

*Primary Examiner* — Mardochee Chery
(74) *Attorney, Agent, or Firm* — Brooks, Cameron & Huebsch, PLLC

(57) ABSTRACT

A method includes configuring a memory system with a first set of operating characteristics corresponding to a first thermal voltage model, monitoring operation of the memory system, selecting a second thermal voltage model based on the monitored operation of the memory system, configuring the memory system with a second set of operating characteristics corresponding to the second thermal voltage model, and writing data to the memory system configured with the second set of operating characteristics.

20 Claims, 4 Drawing Sheets

MEMORY SYSTEM CHARACTERISTIC CONTROL

PRIORITY INFORMATION

This application claims the benefit of U.S. Provisional Application No. 63/455,120, filed on Mar. 28, 2023, the contents of which are incorporated herein by reference.

TECHNICAL FIELD

Embodiments of the disclosure relate generally to memory sub-systems, and more specifically, relate to memory system characteristic control.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
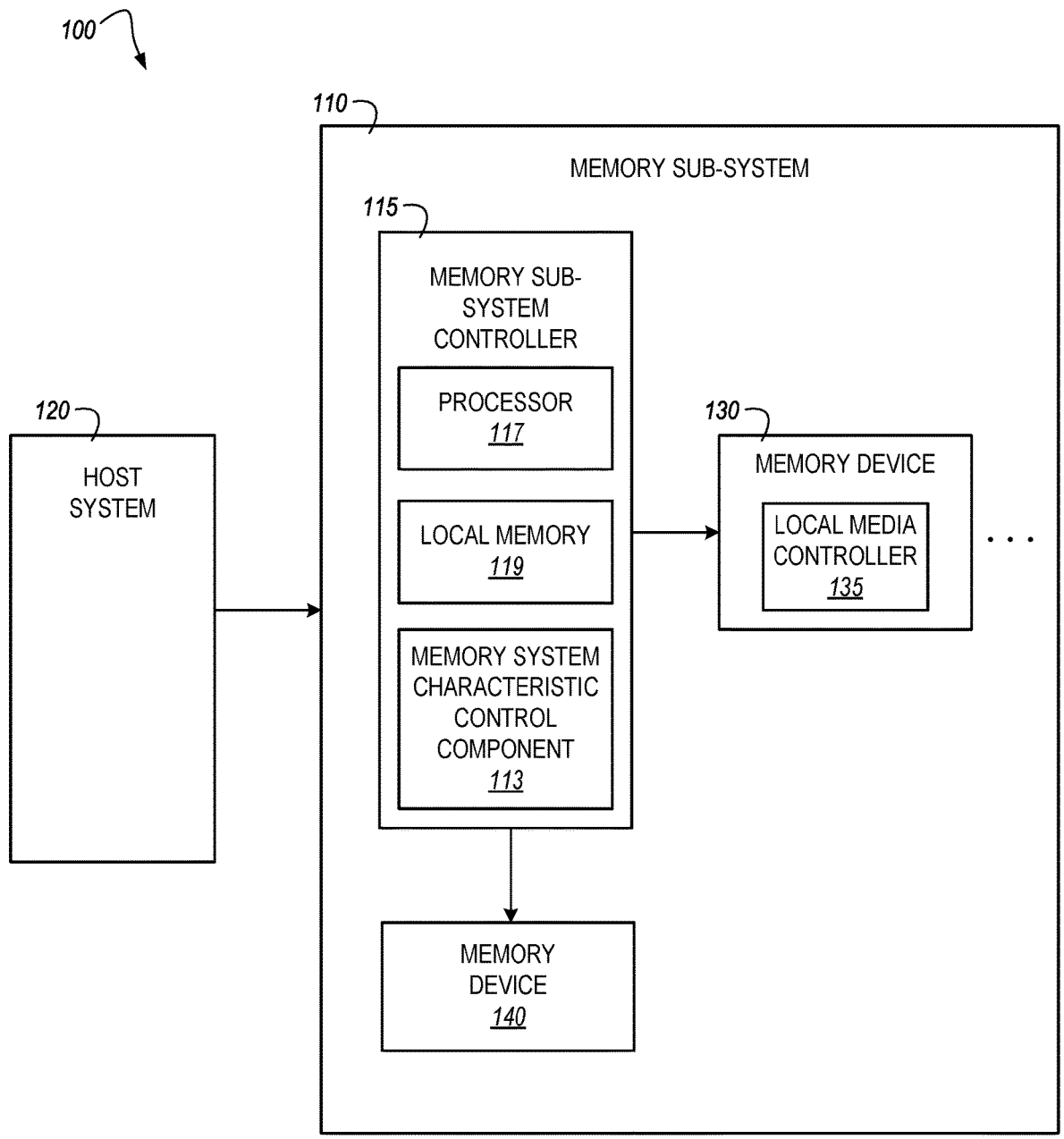
FIG. 1 illustrates an example computing system that includes a memory sub-system in accordance with some embodiments of the present disclosure.

Aspects of the present disclosure are directed to memory sub-system characteristics control, in particular to memory sub-systems that include a memory sub-system characteristics control component. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system. A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter generally refers to a unit of the memory device used to store data and can include a group of memory cells, a word line group, a word line, or individual memory cells. For some memory devices, blocks (also hereinafter referred to as "memory blocks") are the smallest area that can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Memory sub-systems can be utilized for many different applications. These applications include mobile device applications, e.g., mobile phones, tablets, etc., automobile applications, commercial applications, aeronautic applications, military applications, and industrial applications, among others. Different applications may experience different operating temperature ranges and/or may be required to perform under differing conditions. As such, memory sub-systems may be utilized over a very broad operating temperature range.

Memory sub-systems (e.g., flash devices), can operate by storing different charges on a device (e.g., floating gate). The stored charge interferes with a control gate to indicate a value stored in a cell. For example, in a single level cell, the read voltage of the control gate is calibrated to be between a charge for a '1' bit and a charge for a '0' bit; thus, the read voltage may be strong enough to overcome the '1' charge and may not be strong enough to overcome the '0' bit charge. For multi-level-cells (MLCs) of two bits or TLC of three bits, the floating gate charge can have many states (e.g., four and eight respectively) to represent two or three bits at each state.

Charge accumulation and dissipation from the cells varies with temperature. Higher read errors due to different write and read temperatures (e.g., a write at −40° C. and read at 108° C. and vice versa), are related to the unequal $V_T$ distribution shifts between the NAND cell voltage and the read voltages. This is known as a cross-temperature (e.g., a cross-temperature event), where the charge on the cell crosses a read boundary due to the temperature. Memory sub-systems (e.g., NAND flash memory) can be temperature sensitive. For instance, in NAND flash memory, writing data at a first temperature and then reading the data at a second temperature, which is different than the first temperature, as discussed further herein, can result in an increased raw bit error rate (RBER), as compared to writing data and then reading the data at a same temperature.

Some previous approaches to address cross-temperature adverse effects have utilized temperature compensation schemes, such as built in temperature compensation schemes that are based on a particular thermal voltage model. Generally, built in temperature compensation schemes have been utilized to adjust read voltages. For instance, a particular voltage range (e.g., read voltage range) and/or temperature compensation scheme may be selected during or immediately following a power-on event of a memory device. For example, subsequent to a power-on event a memory device may be configured with a particular thermal voltage model to ensure the device is suitable for use by an end user over a broad range of potential operational conditions.

As used herein, a thermal voltage model generally refers to a model that characterizes the behavior of a memory cell under different temperature conditions. For instance, in a thermal voltage model, the voltage threshold of a memory cell is affected by temperature variations. As the temperature increases, the threshold voltage decreases, and as the temperature decreases, the threshold voltage increases. That is, reliability and functionality of memory devices may be affected by temperature variations. By using a particular thermal voltage model, designers can optimize the design and performance of memory devices for different temperature environments.

Unlike memory devices located at a fixed/predetermined location (e.g., servers located in a server room) which may be climate controlled, memory devices in mobile/portable electronic devices may potentially experience a wide range of operational conditions. Examples of mobile/portable electronic devices include laptops, tablets, wearable electronic devices, cellular phones, automobiles, watercraft, aircraft, among other types of mobile/portable electronic devices. For instance, a memory device in an automobile may be configured to potentially operate over a broad voltage range and/or a broad temperature range (e.g., in an operational temperature range from −40° C. to 125° C., among other possibilities).

Yet, there may be a tradeoff in memory device performance (e.g., higher power consumption, lower performance, etc.) with such a broad configuration of the memory device (e.g., a memory device configured based on a broad fixed thermal voltage model). For instance, an amount of latency, a program/erase (P/E) cycle time, and/or a burst transfer rate of the memory device configured to operate at any of the potential environmental conditions may be worse (e.g., slower/longer) than memory devices which are configured to operate at a smaller subset of the potential environmental conditions (e.g., to operate over a smaller range of temperatures). Similarly, an amount of power consumed by the memory device configured to operate at any of the potential environmental conditions may be worse (e.g., higher) than memory devices which are configured to operate at a smaller subset of the potential environmental conditions.

Further, memory systems which are deployed in portable/mobile devices (e.g., automobiles) may be operated in a relatively small range of actual environmental conditions as compared to the broad range of operational conditions at which the memory device may be configured to potentially operate. As a non-limiting example, a memory device included in a portable/mobile device (e.g., an automobile) located in a particular geographic location (e.g., located in a particular area in the state of California) may not encounter actual operational temperatures that are at or near a lower end of a broad operation range. Alternatively, or in addition, the memory device may employ a thermal regulator or other circuitry that constraints (e.g., over-constraints) the memory device to operate at a broad range of operational temperatures without accounting for actual operational temperature experienced by the memory device. In any case, retaining the configuration of the memory device to operate at the broad range of operational conditions despite the memory device actually operating at a small subset of the broad range of operational conditions may decrease memory device performance (e.g., increase latency/computational times, etc.) and/or increase memory device power consumption.

Aspects of the present disclosure address the above and other deficiencies by utilizing memory system characteristic control. For instance, a memory system may be configured with a first set (e.g., an initial set) of operating characteristics corresponding to a first thermal voltage model. The first thermal voltage model may correspond to a broad range of potential operational conditions such as a broad voltage range and/or a broad operational temperature range (e.g., from −40° C. to 125° C. or −40° C. to 105° C., etc.). For example, the memory system may be configured with the first set of operating characteristics corresponding to a first thermal voltage model when the memory device is initially power-on to ensure that the memory device can satisfactorily operate regardless of the operational environment in which the memory device is deployed.

Yet, as mentioned, such a broad configuration of the memory device may result in a reduction of performance of the memory device such as an increase in latency. Such latency can be undesirable, especially in critical applications and/or in applications in demanding applications in which very high memory sub-system performance is expected. Further, this degraded performance that can be exhibited in such approaches can be further exacerbated in mobile (e.g., automobile, smartphone, internet of things, etc.) memory deployments in which an amount of physical space available to house a memory sub-system is limited in comparison to traditional computing architectures.

Accordingly, in some embodiments, operation of the memory device may be monitored subsequent to configuration of the memory device with the first set of operating characteristics. For example, an operational temperature, an operational voltage, and amount of time elapsed since powering on of the memory device, and/or an amount of power supplied to the memory device may be monitored for a period of time subsequent to configuration of the memory device with the first set of operating characteristics, as described herein. Subsequent to elapse of the period of time, a second thermal voltage model may be selected based on the monitoring (e.g., based on actual monitored operational temperatures of the memory device), as described herein.

The memory device may then be configured (e.g., reconfigured) with a second set of operating characteristics that correspond to the second thermal voltage model such that the memory device may be operated (e.g., write data, read data, etc.) with the second set of operating characteristics. For example, an interrupt (e.g., an interrupt request) may be sent subsequent to elapse of the period of time from an internal timer to a controller and/or the memory system. Responsive to receipt of the interrupt, the controller may select the second thermal voltage model, determine the second set of operating characteristics corresponding to the second thermal voltage model, and subsequently reconfigure the memory system to operate in accordance with the second set of operating characteristics.

Notably, the second thermal voltage model may include or be based on a narrower range of operational conditions that correspond to the actual operational conditions experienced by the memory device as compared to the potential range of operational conditions in the first thermal voltage model. For instance, the second thermal voltage model may include an upper operational temperature that is less than an upper operational temperature in the first thermal voltage model, a lowest operational temperature that is higher than a lowest operational temperature in the first thermal voltage model, or both. As such, the memory device may exhibit enhanced performance and/or reduced power consumption when configured with the second set of operating characteristics. For instance, the second set of operational characteristics may permit the memory device to be operated with reduced latency, improved P/E cycle time, improved burst transfer rate, etc. in comparison to approaches that do not configure the memory device with a second set of operational characteristics, as described herein. While examples are described herein with reference to given sets of operating characteristics (e.g., a first set operating characteristics, a second set of operating characteristics, etc.), however, and it will be appreciated that a "third," "fourth,", "nth", set of operating characteristics may be utilized in concert with the present disclosure.

Moreover, in some embodiments, the memory system may be reverted to (reconfigured with or "re-tuned to") the first set of operating characteristics (or other set of operating characteristics corresponding to a thermal voltage model having a broader temperature range than a current thermal voltage model) subsequent to being configured to operate with a different set of operating characteristics corresponding to a current thermal voltage model. In some embodiments, the memory system may be reverted to the first set of operating characteristics (or other set of operating characteristics) responsive to the memory system experiencing an environmental condition that is outside of the current thermal model (e.g., with corresponding operating characteristics at which the memory system is currently operating) and/or experiencing a raw bit error rate (RBER) that exceeds a RBER threshold. For instance, responsive to the memory device experiencing an environmental condition (e.g., a temperature) that is outside of the current voltage model (e.g., the second thermal voltage model) the memory system may be reverted from the current set of operating characteristics (e.g., the second set of operating characteristics) corresponding to a current voltage model to the first set of operating characteristics (or other set of operating characteristics corresponding to a thermal voltage model having a broader temperature range than the current thermal voltage model) to ensure that the memory device continues to reliably operate (e.g., mitigates any cross-temperature events) if the memory system (e.g., a mobile memory system such as an automobile) moves or otherwise experiences changes in an operational environment. For example, the memory device may be reverted from the current set of operating characteristics to a different set of operating characteristics corresponding to a thermal voltage model having a broader temperature range than the current temperature range response to the memory device experiencing a temperature (e.g., an internal temperature of the memory device) that is greater than a threshold temperature. In some embodiments, the memory device may be reverted, as described above, response to the memory device experiencing a temperature that exceeds the threshold temperature for a threshold amount of time (e.g., several seconds, several minutes, etc.).

Similarly, responsive to the memory device experiencing a bit error rate (e.g., a RBER) or other indicator of performance that exceeds a performance threshold such as a bit error rate threshold corresponding to a particular bit error rate, the memory system may be reverted from the current set of operating characteristics (e.g., the second set of operating characteristics) corresponding to a current voltage model to the first set of operating characteristics (or other set of operating characteristics corresponding to a thermal voltage model having a broader temperature range than the current thermal voltage model) to ensure that the memory device continues to reliably operate. In some instance, the temperature threshold and/or the performance threshold (e.g., a bit error threshold) may be reduced over the operational lifetime of the memory system to ensure the memory system continues to reliably operate over the operation lifetime of the memory system. For instance, the temperature threshold and/or the performance threshold may be incrementally decreased based on a quantity of PEC cycles or other indicator of an operational lifetime of the memory system.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

In other embodiments, the computing system 100 can be deployed on, or otherwise included in a computing device such as a desktop computer, laptop computer, server, network server, mobile computing device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 includes a processing unit 121. The processing unit 121 can be a central processing unit (CPU) that is configured to execute an operating system. In some embodiments, the processing unit 121 comprises a complex instruction set computer architecture, such an x86 or other architecture suitable for use as a CPU for a host system 120.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include memory system characteristic control circuitry 113. Although not shown in FIG. 1 so as to not obfuscate the drawings, the memory system characteristic control circuitry 113 can include various circuitry to facilitate aspects of the disclosure described herein. In some embodiments, the memory system characteristic control circuitry 113 can include special purpose circuitry in the form of an ASIC, FPGA, state machine, hardware processing device, and/or other logic circuitry that can allow the memory system characteristic control circuitry 113 to orchestrate and/or perform operations (configure the memory system with a second set of operating characteristics, etc.) in accordance with the disclosure.

In some embodiments, the memory sub-system controller 115 includes at least a portion of the memory system characteristic control circuitry 113. For example, the memory sub-system controller 115 can include a processor 117 (processing device) configured to execute instructions stored in local memory 119 for performing the operations described herein. In some embodiments, the memory system characteristic control circuitry 113 is part of the memory sub-system 110, an application, or an operating system. The memory system characteristic control circuitry 113 can be resident on the memory sub-system 110 and/or the memory sub-system controller 115. As used herein, the term "resident on" generally refers to something that is physically located on a particular component. For example, the memory system characteristic control circuitry 113 being "resident on" the memory sub-system 110, for example, generally refers to a condition in which the hardware circuitry that comprises the memory system characteristic control circuitry 113 is physically located on the memory sub-system 110. The term "resident on" may be used interchangeably with other terms such as "deployed on" or "located on," herein.

The example system 110, which can be referred to in the alternative as an "apparatus," includes a memory sub-system controller 115 and memory system characteristic control circuitry 113 (referred to in the alternative as "characteristic control circuitry" 113). In a non-limiting example, an apparatus (e.g., the memory sub-system 110) includes a memory resource such as the local memory 119 and a processing device (e.g., the memory system characteristic control circuitry 113). The apparatus can be a system-on-chip, although embodiments are not so limited.

Figure 2:
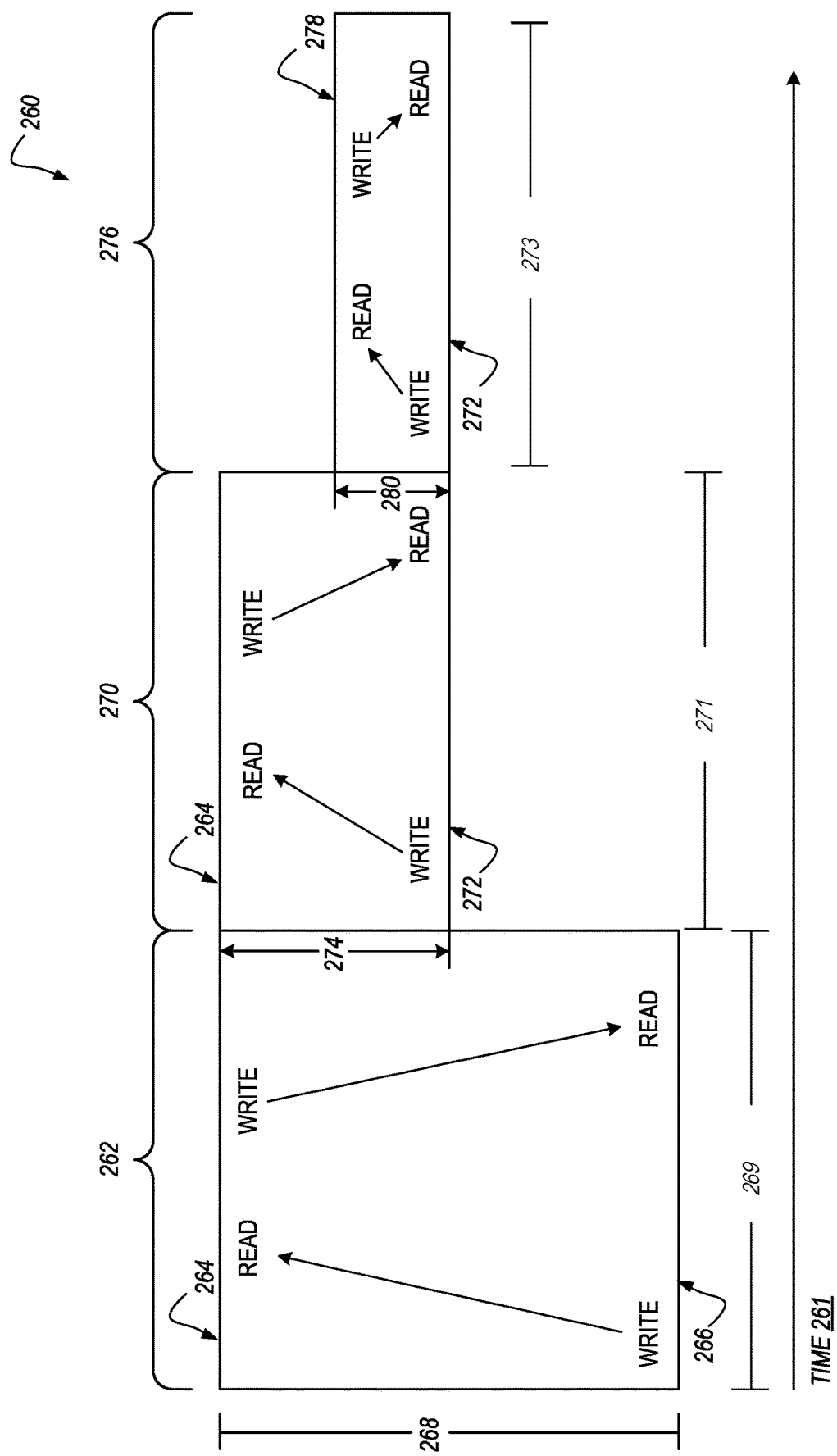
FIG. 2 illustrates a diagram including representations of example thermal voltage models corresponding to memory system characteristic control in accordance with some embodiments of the present disclosure.

In some embodiments, the memory system characteristic control circuitry 113 can configure a memory system with a set of operating characteristics corresponding to a thermal voltage model, as described in greater detail herein with respect to FIG. 2. The set of operating characteristics and/or the thermal voltage model may be stored in and/or retrieved from a data structure that can be stored in one of the memory devices 130/140 and/or the local memory 119. As used herein, a "data structure" such as a translation table generally refers to a specialized format for organizing and/or storing data, which may or may not be organized in rows and columns. Examples of data structures include arrays, files, records, tables, trees, linked lists, hash tables, etc. In some embodiments, the data structure can be configured to store a logical-to-physical (L2P) mapping table, although embodiments are not limited to this particular example. For instance, the memory system characteristic control circuitry may configure a memory system with a particular set of operating characteristics based on actual environmental conditions (e.g., actual operational temperatures of memory components in a memory device) experienced by a memory device. As such, embodiments herein can realize a reduction in power consumption and/or an improvement in performance of the memory device, as detailed herein.

Figure 4:
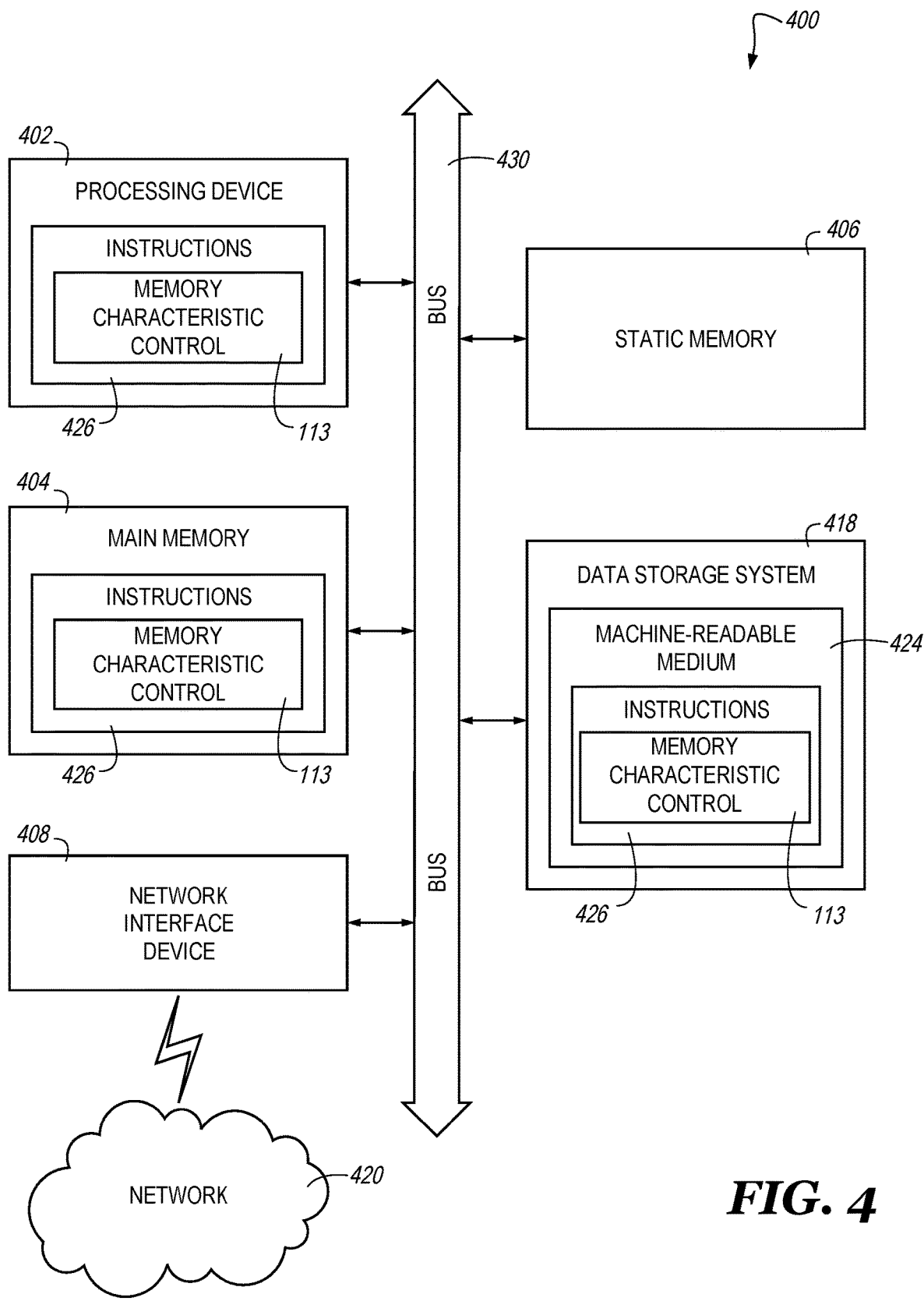
FIG. 4 is a block diagram of an example computer system in which embodiments of the present disclosure may operate.

In a non-limiting example, a non-transitory computer-readable storage medium (e.g., the machine-readable storage medium 424 illustrated in FIG. 4, herein) comprises instructions (e.g., the instructions 426 illustrated in FIG. 4, herein) that, when executed by a processing device (e.g., the memory characteristic circuitry 113 and/or the processing device 402 illustrated in FIG. 4, herein), cause the processing device to configure a memory system with a first set of operating characteristics corresponding to a first thermal voltage model, monitor operation of the memory system for a period of time, and select a second thermal voltage model based on the monitored operation of the memory system for the period of time, as described herein. For instance, in some embodiments, the instructions can be further executed by the processing device to configure the memory system with a second set of operating characteristics corresponding to the second thermal voltage model and operate (e.g., write data to the memory system configured with the second set of operating characteristics). Embodiments are not limited to a "first" and "second" set of operating characteristics, however, and it will be appreciated that a "third," "fourth,", "nth", set of operating characteristics may be utilized in concert with the present disclosure.

FIG. 2 illustrates a diagram 260 including representations of example thermal voltage models corresponding to memory system characteristic control in accordance with some embodiments of the present disclosure. The thermal voltage models include a first thermal voltage model 262, a second thermal voltage model 270, and a third thermal voltage model 276. While FIG. 2 illustrates three thermal voltage models, the quantity of thermal voltage models may be increased or decreased.

The thermal voltage models may include various operational temperatures over which the memory system may be operated. For instance, the first thermal voltage model 260 may have a broad temperature range 268 extending from a lower operational temperature 266 (e.g., −40° C.) to an upper operational temperature 264 (e.g., 125° C.). For example, the memory system may initially (e.g., during or subsequent to a power-up event) be configured to operate in accordance with the first thermal voltage model 262 to ensure that the memory device can be suitably operated over a wide range of potential conditions. For instance, as illustrated in FIG. 2, the memory system may be configured with a first set of operating characteristics (e.g., with a suitable amount of latency, cycle time, etc.) that correspond to the first thermal voltage model 268 to permit read operations and write operations to occur within the broad temperature range 268.

As detailed herein, operation of the memory device may be monitored for a period of time 269 (e.g., an initial period of time). In some embodiments, a beginning of the period of time 269 may coincide with a time of the power-on event of the memory system. For instance, an operational voltage and/or an operational temperature of the memory device, such as an operational temperature of memory components and/or other components (e.g., a processing resource, etc.), may be monitored subsequent to powering-on the memory device over the period of time 269. The memory device may perform various memory operations (e.g., read operations, write operations, etc.) while configured with the first set of operating characteristics over the period of time 269.

In some embodiments, the period of time 269 may have a preconfigured or predetermined duration. For instance, the period of time 269 may have a duration that is preconfigured (e.g., by a manufacturer of the memory device, among other possibilities). However, in some embodiments the duration of the period of time 269 may have a variable duration that determined based on operational conditions (e.g., the time period elapses when the operational temperature of the memory device reaches an operational temperature threshold), etc.

The period of time 269 may have a duration (e.g., preconfigured duration) that is at least one minute, at least five minutes, at least 30 minutes, at least 60 minutes, at least 12 hours, or at least 24 hours long. For instance, the duration of time 269 may be substantially equal to one minute, five minutes, 30 minutes, 60 minutes, 12 hours, or 24 hours, in some embodiments. For instance, having the duration of time be equal to substantially five minutes or longer may permit the memory system (e.g., the memory sub-system 110) subsequent time to acclimate to an operational environment in which the memory device is disposed through self-heating (e.g., through ohmic heating) or self-cooling (e.g., through liquid and/or fan based cooling) of the memory system and/or may otherwise permit more accurate selection of a suitable thermal voltage model. In some embodiments the duration of the period of time 269 may be less than or equal to five minutes, less than or equal to 30 minutes, less than or equal to 60 minutes, less than or equal to at least 12 hours, or less than or equal to 24 hours long. For instance, the duration of time 269 may be less than or equal to 30 minutes to promote timely selection of a second thermal voltage model such that the memory system may relatively quickly realize enhanced performance once reconfigured to operate based on the second thermal voltage model 270, as described herein.

The operational temperature and/or an operational voltage may be monitored directly via a sensor or collection of sensors included in the memory device and/or memory sub-system or may be monitored indirectly (e.g., inferred) from other data such as an amount of power consumption, a duration of operation, and/or a type of operation of the memory device. For example, in some embodiments, a temperature sensor may monitor an operational temperature and/or a voltage sensor may monitor an operational voltage (e.g., a supply voltage to the memory device and/or a component included in the memory device). The operational conditions (e.g., temperature and/or voltage, etc.) may be monitored continuously, at a fixed interval, or intermittently over the period of time.

In some embodiments, the memory system may include a counter, a voltage sensor, a temperature sensor or any combination thereof that is configured to permit determination of elapse of a period of time and/or to determine if particular criteria have been met that indicate that the memory device should be operated according to the second, third, etc. set of operational characteristics. For instance, a controller may be configured to determine the elapse of the period of time and/or whether particular criteria have been met based on a change in a value associated with the counter, the voltage sensor, the temperature sensor, or any combination thereof. For example, in some embodiments a counter may be incremented a quantity of times and the controller may be based on the change in the incremented value determine that the period of time has elapsed (e.g., that five minutes or some other period of time has occurred subsequent to power-on of a memory system, etc.).

Subsequent to elapse of the period of time 269, the second thermal voltage model 270 may be selected (e.g., selected and utilized) based on the monitored operation of the memory system. For instance, an upper operational temperature, a lower operational temperature, or both, of the second thermal voltage model 270 may be selected based on the monitored operation of the memory system. For example, operational temperatures of the memory system during the period of time 269 may be higher than the lower operational temperature 266 in the first thermal voltage model 262. In such instances, a lower operational temperature 272 in the second thermal voltage model 270 may be higher than the lower operational temperature 266 in the first thermal voltage model 262.

In some embodiments, the lower operational temperature 272 may correspond to a lowest operational temperature monitored during the period of time 271, the upper operational temperature 264 (of the second thermal voltage model 270) may correspond to the highest operational temperature measured during the period of time 271, or both. Having the lower operational temperature 272 correspond to (be equal to) the lowest operational temperature monitored during the period of time 271, the upper operational temperature 264 (of the second thermal voltage model 270) correspond to the highest operational temperature measured during the period of time 271, or both, may maximize performance enhancements (e.g., reduced latency, reduced power consumption, etc.) of the memory device.

However, in some embodiments, the lower operational temperature 272 may be a threshold value (e.g., 10° C., 5° C., etc.) higher than a lowest operational temperature monitored during the period of time, the upper operational temperature 264 (of the second thermal voltage model 270) may be the threshold value lower than the highest operational temperature measured during the period of time 269, or both. Having the lowest operational temperature 272 be a threshold amount higher than the lowest operational temperature monitored during the period of time 269, the upper operational temperature 264 (of the second thermal voltage model 270) be a threshold amount lower than the highest operational temperature measured during the period of time 269, or both, may provide a degree of enhanced performance and yet provide an operational buffer to ensure reliable operation of the memory system even instances when the operational temperature of the memory device during an additional period of time 271 (e.g., a second period of time) is within the threshold amount of the upper/lowest temperatures monitored during the period of time 269. In some embodiments, the additional period of time 271 may have a duration that is equal to the duration of the period of time 269 or is longer than the period of time 269, as described herein. Having the additional period of time 271 have a duration that is equal to the duration of the period of time 269 may promote aspects herein such as providing a balance between realizing improved performance attributable to selection of different voltages models/sets of operating characteristics and incurring computational overhead, increased power consumptions and/or imparting delay associated with reconfiguration of the memory system. Additionally, having the additional period of time 271 have a duration that is longer than the duration of the period of time 269 can provide the improved performance attributable to selection of different voltages models over a longer period of time.

The second thermal voltage model 270 may have at least one operational temperature that is different from corresponding operational temperatures in the first thermal voltage model 262. For instance, an upper operational temperature in the second thermal voltage model may be less than an upper operational temperature in the first thermal voltage model, a lowest operational temperature in the second voltage model is higher than a lowest operational temperature in the first thermal voltage model, or both. For instance, the lower operational temperature 272 may be relatively higher than the lower operational temperature 266. Thus, a temperature range 274 between the upper operational temperature 264 of the second thermal voltage model 270 can be narrower (e.g., smaller) than the temperature range 268 of the first thermal voltage model. Stated differently, a difference between the upper operational temperature 264 and the lower operational temperature 266 in the first thermal voltage model 262 may be equal to a first value (e.g., 145° C.), while a difference between the upper operational temperature 264 and the lower operational temperature 272 (e.g., 45° C.) in the second thermal voltage model 270 may be equal to a second value (e.g., 60 degrees) that is less than the first value. In some embodiments, the first value may be equal to or greater than 100° C. (e.g., 145° C.) to ensure that the memory system may suitably operate at a wide range of potential operation conditions whereas the second value may be less than 100° C. to permit realization of enhanced memory system performance, as described herein.

Notably, the above mentioned narrower temperature range 274 may correspond to a narrower set of operating characteristics at which the memory device may be configured to operate. For instance, the memory device can be configured (e.g., reconfigured) with a second set of operating characteristics (e.g., with a suitable amount of latency, cycle time, etc.) that correspond to the second thermal voltage model 270 to permit read operations and write operations to occur within the narrower temperature range 274. Stated differently, data may be written to and/or read from the memory system configured with the second set of operating characteristics. The second set of operating characteristics may be tailored to operation of the memory device within the narrower temperature range 274 and thereby yield enhanced memory device performance (e.g., less latency, less power consumption, etc.). For instance, the second set of operating characteristic may include relatively narrower trim voltage ranges which may be employed and/or otherwise may configure to operate the memory system with shorter cycle times, less latency (e.g., an amount of time to provide a host with data), and/or with less power consumption than operation of the memory system at the first set of operating characteristics.

In some embodiments, memory operations may be performed with the memory system that is configured with the second set of operating characteristics for the additional period of time 271. Operating characteristics such as an operational temperature of the memory system may be monitored, as described herein, during the additional period of time 271. Subsequent to elapse of the additional period of time, the memory system may be configured (e.g., reconfigured) with a third set of operating characteristics that is based on the third thermal voltage model 276 and the memory system may be operated (e.g., read data, write data, etc.) when configured with the third set of operating characteristics of a subsequent period of time 273. In some embodiments, the subsequent period of time 273 may have a duration that is equal to the duration of the period of time 269 and/or the additional period of time 271 to promote aspects herein such as providing a balance between realizing improved performance attributable to determination of different voltages models/sets of operating characteristics and incurring computational overhead, increased power consumptions and/or imparting delay associated with reconfiguration of the memory system.

However, in some embodiments, at least the additional period 271 may have a duration of time that is longer than the (initial) period of time 269. Further, in some embodiments, each of the additional period of time 271 and the subsequent period of time 273 may have respective durations that are longer than the (initial) period of time 269. Having at least the additional period 271 may have a duration of time that is longer than the (initial) period of time 269 may promote aspects herein such as permitting timely selection of a second voltage model and operating the memory system in accordance with the second set of operating criteria corresponding to the second voltage model for a relative duration over which memory system performance may be improved (e.g., as compared to memory system performance when configured with the first set of operating criteria), etc.

The third thermal voltage model 276 may have at least one operational temperature that is different from corresponding operational temperatures in the second thermal voltage model 270. For instance, an upper operational temperature in the third thermal voltage model 276 may be less than an upper operational temperature in the second thermal voltage model 270, a lowest operational temperature in the third voltage model 276 may be higher than a lowest operational temperature in the second thermal voltage model 270, or both. For instance, the upper operational temperature 278 may be relatively lower than the upper operational temperature 264. Thus, a temperature range 280 between the upper operational temperature 278 and the lower operational temperature 272 of the third thermal voltage model 276 can be narrower (e.g., smaller) than the temperature range 274 of the second thermal voltage model 270. Stated differently, a difference between the upper operational temperature 264 and the lower operational temperature 272 in the second thermal voltage model 270 may be equal to a first value (e.g., 45° C.), while a difference between the upper operational temperature 278 (85° C.) and the lower operational temperature 272 (e.g., 45° C.) in the third thermal voltage model 276 may be equal to a third value (e.g., 40° C.) that is less than the first value (e.g., 145° C.) and that is less than the second value (e.g., 60° C.).

Notably, the above mentioned narrowest temperature range 280 may correspond to an even narrower set of operating characteristics at which the memory device may be configured to operate. For instance, the memory device can be configured (e.g., reconfigured) with a third set of operating characteristics (e.g., with a suitable amount of latency, cycle time, etc.) that correspond to the third thermal voltage model 276 to permit read operations and write operations to occur within the temperature range 280. Stated differently, data may be written to and/or read from the memory system configured with the third set of operating characteristics. The third set of operating characteristics may be tailored to operation of the memory device within the narrowest temperature range 280 and thereby yield further enhanced memory device performance (e.g., less latency, less power consumption, etc.). For instance, the third set of operating characteristic may include relatively narrow trim voltage ranges which may be employed and/or otherwise may configure to operate the memory system with shorter cycle times, less latency (e.g., an amount of time to provide a host with data), and/or with less power consumption than operation of the memory system at the second set of operating characteristics.

That is, the second set of operating characteristics includes at least one operating characteristic that is different from the first set of operating characteristics and the third set of operating characteristics includes at least one operating characteristic that is different than the second set of operating characteristics. In some embodiments, the at least one operational characteristic that is different may be an amount of read latency, a program/erase (P/E) cycle time, a burst transfer rate, or any combination thereof, among other possibilities. For example, an amount of read latency in (or attributable to operation at) the second set of operating characteristics may less than an amount of read latency in (or attributable to operation at) the first set of operating characteristics, an amount of P/E cycle time in (or attributable to operation at) the second set of operating characteristics may be less than an amount of P/E cycle time in the first set of operating characteristics, and/or a burst transfer rate in (or attributable to operation at) the second set of operating characteristics may be greater (higher) than a burst transfer rate in the first set of operating characteristics. Similarly, an amount of read latency in (or attributable to operation at) the third set of operating characteristics may less than an amount of read latency in (or attributable to operation at) the second set of operating characteristics, an amount of P/E cycle time in (or attributable to operation at) the third set of operating characteristics may be less than an amount of P/E cycle time in the second set of operating characteristics and/or a burst transfer rate in (or attributable to operation at) the third set of operating characteristics may greater than a burst transfer rate in (or attributable to operation at) the second set of operating characteristics.

In some embodiments, operation of the memory system (e.g., the memory sub-system 110) may be monitored while the memory system is configured with the second set of operating characteristics and/or the third set of operating characteristics. For instance, an operational temperature of the memory system (e.g., an operational temperature of a memory component and/or memory device included in the memory system) may be monitored while operating at the second set or third set of operating characteristics.

Figure 3:
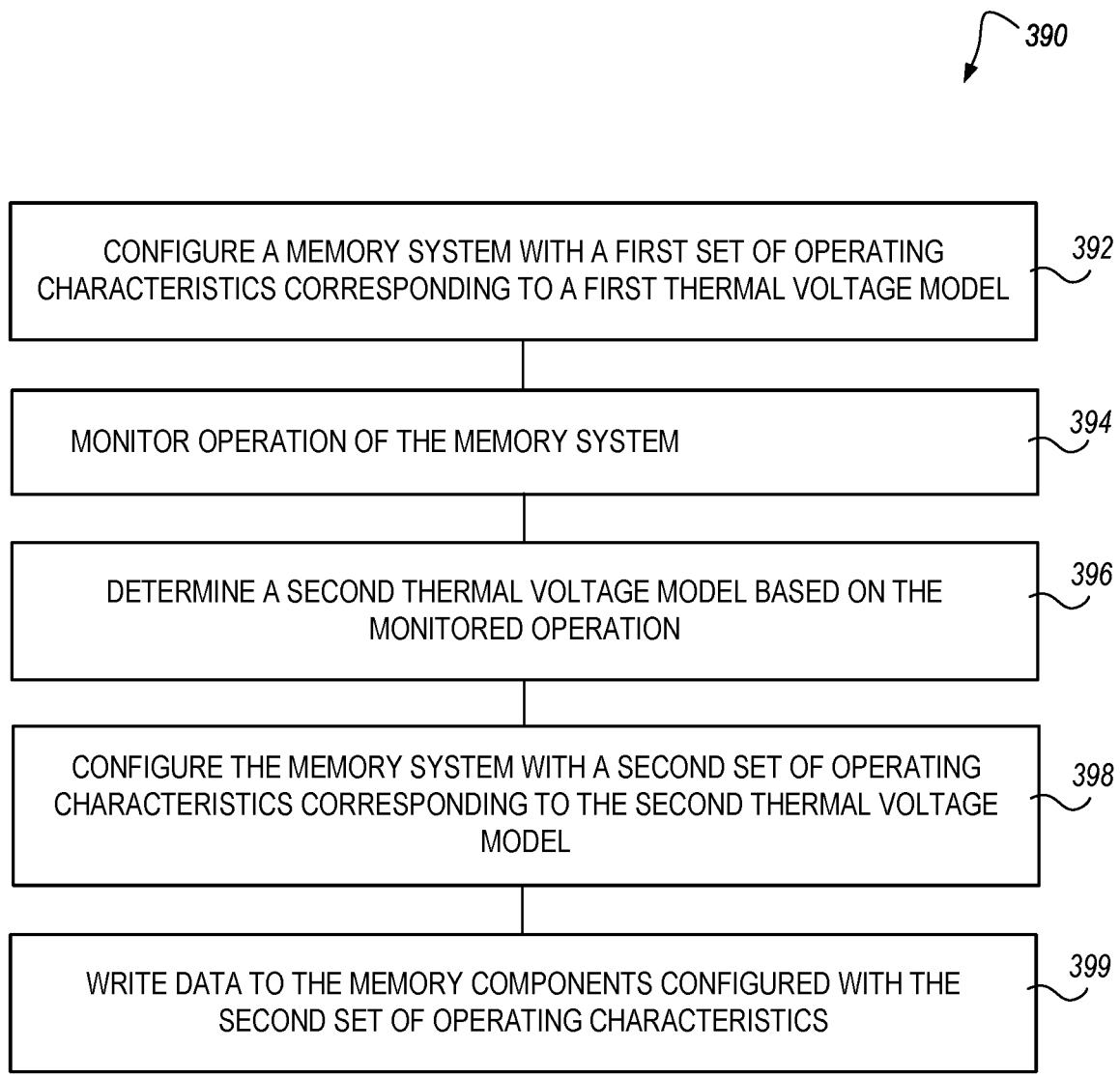
FIG. 3 is a flow diagram corresponding to a method for memory system characteristic control in accordance with some embodiments of the present disclosure.

FIG. 3 is a flow diagram corresponding to a method 390 for memory sub-system characteristic control in accordance with some embodiments of the present disclosure. The method 390 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 390 is performed by the memory sub-system characteristics control component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 392, the method 390 includes configuring a memory system (e.g., the memory sub-system 110 of FIG. 1) with a first set of operating characteristics corresponding to a first thermal voltage model. The first set of operating characteristics may be base operating characteristics (e.g., base latency setting, base cycle time settings, and/or base trim settings, etc.) at which the memory system is configured by a manufacturer of a memory system (e.g., configured by the manufacturer shortly after a time of manufacture of the memory system). In some embodiments, the method 390 includes configuring the memory system with the first set of operating characteristics responsive to a power-on event (e.g., an initial power on event) associated with the memory system. For instance, the first set of operating characteristics may be configured by a manufacturer based on performance (or estimated performance) of the memory device during or immediately following an initial power-on operation associated with the memory system (e.g., within an threshold amount of time following the initial power-on operation that is less than the period of time, described herein). The first set of operating characteristics may correspond to a first thermal voltage model (e.g., an initial thermal voltage model) configured by a manufacturer to yield a suitable operational window (e.g., a broad potential operational temperature range such as an temperature range from −40° C. to 105° C. or from −40° C. to 125° C.).

The method 390 includes operating (e.g., writing data, reading data, etc.) the memory system with the first (initial) thermal voltage model for a period of time. For instance, the method may include writing data to the memory system with the first thermal voltage model for the period of time. As mentioned, the first thermal voltage model of the memory system may be suitable for operation of the memory device initially (e.g., to permit suitable memory system operational across a broad range of potential conditions), but may not permit tailoring of the memory system operation to enhance memory system performance based on actual operational conditions experienced by the memory system over the period of time.

At operation 394, the method 390 includes monitoring operation of the memory system. For instance, an operational temperature, operational voltage, or both, of the memory system may be monitored when operating in accordance with the first set of operating characteristics corresponding to the first thermal voltage model. Operation of memory system may be monitored during the above mentioned period of time, subsequent to the period of time, or both. For instance, an operational temperature may be monitored over a period of time to permit determination of relative amounts of time that the memory system has a monitored operational temperature that is equal to, exceeds, and/or is less than respective temperatures (e.g., an upper operational temperature, a lower operational temperature, etc.) included in the first thermal voltage model, as described in FIG. 2.

The operation of the memory system may be monitored continuously, at a fixed interval, or intermittently. For instance, in some embodiments an operational temperature of the memory system (e.g., a memory component in the memory system) may be continuously monitored. However, in some embodiments, the operational temperature may be monitored at a fixed interval and/or may be intermittently monitored. For example, an operational temperature may be monitored responsive to a change in a memory system condition and/or responsive to a memory operation (e.g., a read operation, write operation, and/or an erase operation) involving the memory system, among other possibilities.

In some embodiments, the memory system can be analogous to the memory sub-system 110 illustrated in FIG. 1 while the memory component can be analogous to the memory devices 130/140 illustrated in FIG. 1. As mentioned, in some embodiments an operational temperature of a memory component of the memory system may be monitored.

At operation 396, the method 390 includes selection of a second thermal voltage model based on the monitored operation (e.g., based on the monitored operational temperature). For instance, the second thermal voltage model may correspond to a second set of operational temperatures (e.g., including an upper operational temperature and a lower operational temperature) having at least one value that is selected based on the monitored operational temperature, as described herein with respect to FIG. 2. That is, the second thermal voltage model may include different operational temperatures than the first thermal voltage model, as described herein. As such, the second thermal voltage model may account for actual operation conditions experienced by the memory system over a relatively long period of time and thereby permit accurately tailoring of the trim settings (e.g., to mitigate occurrence of cross-temperature events that may otherwise occur when operating the memory system).

At operation 398, the method 390 includes configuring the memory system with a second set of operating characteristics corresponding to the second thermal voltage model, as described herein. As mentioned, the second set of operating characteristics may include at least one operational characteristic that is different than the first set of operating characteristics. For instance, the second set of operating characteristics may include a different set of trim voltages associated with operation of the memory system. The second set of operating characteristics may include characteristics that are attributable to enhanced performance of the memory system (e.g., reduced power consumption, decreased latency, etc.) as compared to performance of the memory system when configured with the first set of operating characteristics. For instance, at operation 399, the method 390 includes writing data to memory system that is configured with the second set of operating characteristics to realize enhanced performance of the memory system configured with the second set of operating characteristics.

In some embodiments, the aspects of the method 390 may be performed with a non-volatile memory system that includes non-volatile memory components and as replacement gate three-dimensional NAND memory components.

FIG. 4 is a block diagram of an example computer system 400 in which embodiments of the present disclosure may operate. For example, FIG. 4 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1), that includes, is coupled to, or utilizes a memory sub-system (e.g., the memory sub-system 110 of FIG. 1), or can be used to perform the operations of a controller (e.g., to execute an operating system to perform operations corresponding to the characteristics control component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 such as read-only memory (ROM, flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage system 418, which communicate with each other via a bus 430.

The processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory sub-system 110 of FIG. 1.

In one embodiment, the instructions 426 include instructions to implement functionality corresponding to a characteristics control component (e.g., the characteristics control component 113 of FIG. 1). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
configuring a memory system with a first set of operating characteristics corresponding to a first thermal voltage model;
monitoring operation of the memory system;
selecting a second thermal voltage model based on the monitored operation of the memory system;
configuring the memory system with a second set of operating characteristics corresponding the second thermal voltage model; and
writing data to the memory system configured with the second set of operating characteristics.

2. The method of claim 1, further comprising configuring the memory system with the first set of operating characteristics responsive to a power-on event associated with the memory system.

3. The method of claim 1, further comprising:
monitoring the operation of the memory system for a predetermined period of time, wherein a beginning of the predetermined period of time coincides with a time of the power-on event; and
subsequent to elapse of the predetermined period of time, selecting the second thermal voltage model based on the monitored operation of the memory system.

4. The method of claim 1, wherein the second thermal voltage model includes at least one operational temperature that is different than a corresponding operational temperature in the first thermal voltage model.

5. The method of claim 4, wherein:
an upper operational temperature in the second thermal voltage model is less than an upper operational temperature in the first thermal voltage model; or
a lowest operational temperature in the second voltage model is higher than a lowest operational temperature in the first thermal voltage model.

6. The method of claim 4, wherein:
an upper operational temperature in the second thermal voltage model is less than an upper operational temperature in the first thermal voltage model; and
a lowest operational temperature in the second voltage model is higher than a lowest operational temperature in the first thermal voltage model.

7. The method of claim 1, wherein monitoring the operation of the memory system includes monitoring operational temperatures of the memory system.

8. The method of claim 1, wherein the second set of operating characteristics includes at least one operational characteristic that is different than a corresponding operational characteristic in the first set of operating characteristics.

9. The method of claim 8, wherein the at least one operational characteristic that is different is an amount of read latency, a program/erase (P/E) cycle time, or both.

10. The method of claim 9, wherein:
the amount of read latency in the second set of operating characteristics is less than an amount of read latency in the first set of operating characteristics, the amount of P/E cycle time in the second set of operating characteristics is less than an amount of P/E cycle time in the first set of operating characteristics;
the burst transfer rate in the second set of operating characteristics is greater than a burst transfer rate in the first set of operating characteristics; or
any combination thereof.

11. An apparatus, comprising:
a processing device configured to:
responsive to an occurrence of a power-on event associated with a memory system, configure the memory system with a first set of operating characteristics corresponding to a first thermal voltage model;
write data to memory system configured with the first set of operating characteristics for a period of time;
monitor an operational temperature of the memory system for the period of time;
subsequent to elapse of the period of time, select a second thermal voltage model based on the monitored operational temperature;
configure the memory system with a second set of operating characteristics corresponding the second thermal voltage model; and
write data to the memory system configured with the second set of operating characteristics.

12. The apparatus of claim 11, wherein a difference between an upper operational temperature and a lower operational temperature in the first thermal voltage model is equal to a first value.

13. The apparatus of claim 12, wherein a difference between an upper operational temperature and a lower operational temperature in the second thermal voltage model is equal to a second value that is less than the first value.

14. The apparatus of claim 13, wherein the controller is configured to revert the memory system configured with the second set of operating characteristics to the first set of operating characteristics responsive to:
the memory system experiencing a temperature that exceeds a threshold temperature; or
the memory system experiencing a bit error rate that that exceed a bit error rate threshold.

15. The apparatus of claim 11, further comprising a counter, and wherein the controller is further configured to determine the elapse of the period of time based on a change in a value associated with the counter.

16. A system, comprising:
memory components; and
a processing device coupled to the memory components, wherein the processing device is configured to:
write data to the memory components configured with a first set of operating characteristics corresponding to a first thermal voltage model for a period of time subsequent to a power-on event associated with the system;
monitor operational temperatures of at least one of the memory components during the period of time;
subsequent to elapse of the period of time, select a second thermal voltage model based on the monitored operational temperatures, wherein a second set of operating characteristics that correspond to the second thermal voltage model includes an upper operational temperature that is less than an upper operational temperature in the first thermal voltage model, a lowest operational temperature that is higher than a lowest operational temperature in the first thermal voltage model, or both;
configure the memory system with the second set of operating characteristics corresponding to the second thermal voltage model; and
write data to components configured with the second set of operating characteristics.

17. The system of claim 16, wherein the memory components further comprise non-volatile memory components, and wherein the non-volatile memory components further comprise three-dimensional NAND memory components.

18. The system of claim 16, wherein the system is a mobile system.

19. The system of claim 16, wherein the processing device is configured to:
write the data to memory system with the second set of operating characteristics for an additional period of time;
monitor an operational temperatures of the memory system during the additional period of time;

subsequent to elapse of the additional period of time, configure the memory system with a nth set of operating characteristics corresponding to a nth thermal voltage model; and write data to memory system with the third set of operating characteristics.

20. The system of claim 19, wherein a range between an upper operational temperature and a lower operational temperature in the nth thermal voltage model is less than a range between an upper operational temperature and a lower operational temperature in the second thermal voltage model.

* * * * *